United States Patent
Underwood et al.

(10) Patent No.: US 10,732,978 B2
(45) Date of Patent: Aug. 4, 2020

(54) DATA PROCESSING SYSTEMS

(71) Applicant: Arm Limited, Cambridge (GB)

(72) Inventors: Mark Underwood, Cambridge (GB); Hakan Lars-Goran Persson, Bjarred (SE)

(73) Assignee: Arm Limited, Cambridge (GB)

(*) Notice: Subject to any disclaimer, the term of this patent is extended or adjusted under 35 U.S.C. 154(b) by 64 days.

(21) Appl. No.: 16/112,094

(22) Filed: Aug. 24, 2018

(65) Prior Publication Data
US 2020/0065107 A1   Feb. 27, 2020

(51) Int. Cl.
G06F 9/38      (2018.01)
G06F 9/52      (2006.01)
G06F 9/30      (2018.01)

(52) U.S. Cl.
CPC ........ *G06F 9/3814* (2013.01); *G06F 9/30047* (2013.01); *G06F 9/522* (2013.01)

(58) Field of Classification Search
None
See application file for complete search history.

(56) References Cited

U.S. PATENT DOCUMENTS

| | | | |
|---|---|---|---|
| 2008/0180450 A1* | 7/2008 | Dowling | G06F 9/3842 345/503 |
| 2011/0173398 A1* | 7/2011 | Boyle | G06F 12/0862 711/137 |
| 2014/0289445 A1* | 9/2014 | Savich | G06F 13/4022 710/317 |
| 2015/0378920 A1* | 12/2015 | Gierach | G06F 12/0862 711/118 |
| 2017/0109096 A1* | 4/2017 | Jean | G06F 3/0659 |
| 2018/0365036 A1* | 12/2018 | Toal | G06F 9/44505 |

* cited by examiner

*Primary Examiner* — Hyun Nam
(74) *Attorney, Agent, or Firm* — Vierra Magen Marcus LLP

(57) ABSTRACT

A data processing system in which a host processor prepares command streams for causing an accelerator of the data processing system to perform processing tasks for an application executing on the host processor, each command stream including a sequence of commands for implementation by a command stream execution unit of the accelerator. A pre-execution unit is provided that is operable to interpret commands fetched from command stream storage before the command is provided to the command stream execution unit for implementation to determine whether the pre-execution unit is able to perform an action in response to the command and, when the pre-execution unit is able to do so, to perform an action in response to the command.

20 Claims, 10 Drawing Sheets

| | Command stream | EEU interpretation | CSEU interpretation |
|---|---|---|---|
| 0x0000 | MOVE R0, ... | MOVE R0_EEU, ... | MOVE R0_CSEU, ... |
| 0x0008 | MOVE R1, ... | MOVE R1_EEU, ... | MOVE R1_CSEU, ... |
| 0x0010 | PREFETCH (R0, R1) | PREFETCH (R0_EEU, R1_EEU) | NOP |
| 0x0018 | MOVE R0, ... | MOVE R0_EEU, ... | MOVE R0_CSEU, ... |
| 0x0020 | MOVE R1, ... | MOVE R1_EEU, ... | MOVE R1_CSEU, ... |
| 0x0028 | RUN_COMPUTE (R0, R1) | NOP | RUN_COMPUTE (R0CSEU, R1_CSEU) |
| 0x0030 | MOVE R0, ... | MOVE R0_EEU, ... | MOVE R0_CSEU, ... |
| 0x0038 | MOVE R1, ... | MOVE R1_EEU, ... | MOVE R1_CSEU, ... |
| 0x0040 | CALL (R0, R1) | PREFETCH (R0_EEU, R1_EEU) | CALL (R0CSEU, R1_CSEU) |

FIG. 8

| Command stream | | EEU interpretation when barrier passes | EEU interpretation when barrier fails | CSEU interpretation |
|---|---|---|---|---|
| 0x000 | R0 = dynamic value | NOP | NOP | R0 = dynamic value |
| 0x008 | R1 = dynamic value | NOP | NOP | R1 = dynamic value |
| 0x010 | MOVE R0_EEU, R0_CSEU | NOP | NOP | MOVE R0_EEU, R0_CSEU |
| 0x018 | MOVE R1_EEU, R1_CSEU | NOP | NOP | MOVE R1_EEU, R1_CSEU |
| 0x020 | BARRIER_INC BARRIER_0 | NOP | NOP | BARRIER_INC BARRIER_0 |
| ... | ... | ... | ... | ... |
| N + 0x000 | BARRIER_DEP BARRIER0, 1 | BARRIER_DEP BARRIER0, 1 | BARRIER_DEP BARRIER0, 1 | NOP |
| N + 0x008 | LOADM (R0, R1) | PREFETCH(R0_EEU, R1_EEU) | NOP | LOADM(R0_CSEU, R1_CSEU) |
| N +... | ... | ... | NOP | ... |
| N + cache line size | | | NOP | |

BARRIER_0
0 -> 1

Instructions in the same cache line

FIG. 11

DATA PROCESSING SYSTEMS

BACKGROUND

The technology described herein relates to data processing systems and in particular to data processing systems comprising an accelerator that is operable to perform processing work for a host processor wherein the processing work is specified using one or more command stream(s) prepared by the host processor.

Many data processing systems include processing resources, such as a graphics processing unit (GPU) or a video processor (VPU), which may perform processing work for applications that are executing on a main processor (CPU) of the data processing system. For instance, many electronic devices, such as mobile phones or tablets, will include both a host processor (CPU) that executes an operating system, such as Android, capable of running various applications and one or more accelerators, such as a GPU, that provide hardware support for specific functions. In the case of a mobile phone or tablet, for example, the GPU may be used to generate the user interface that is displayed under the control of the operating system, and to compose the frame that is displayed on the display to the user.

In some modern data processing systems, the submission of processing work for the accelerator is controlled using one or more command stream(s), wherein the accelerator may be caused to perform processing work for applications executing on the host processor by the host processor providing a stream of commands (instructions) specifying the processing work to be performed by the accelerator. A command stream is therefore essentially a machine code program that can be executed by a special processor and the accelerator is thus provided with a command stream frontend including a dedicated processing unit, a 'command stream execution unit', for interpreting and implementing these command streams.

A command stream may, for example, contain commands (instructions) to set parameters for processing jobs, as well as commands (instructions) to execute the processing jobs, e.g. using the accelerator hardware units (processing core(s)). The command stream execution unit can then work its way through the command stream, executing, in turn, the commands (instructions) in the command stream and performing, or causing the accelerator hardware to perform, the operations indicated by the commands.

The command streams that are generated by the host processor can be written to appropriate command stream storage, e.g. in (main) system memory. The commands must therefore first be read from this command stream storage into the accelerator before they can be executed thereby.

Similarly, some of the commands (instructions) may relate to memory load operations, e.g., wherein data is to be fetched from system (main) memory into local storage such as a cache or register on the accelerator.

Such operations may be associated with a certain memory access latency, and this can reduce the command stream execution throughput.

The Applicants believe, therefore, that there remains scope for improved mechanisms for operating data processing systems wherein processing work for an accelerator is specified using one or more command stream(s).

BRIEF DESCRIPTION OF THE DRAWINGS

A number of embodiments of the technology described herein will now be described by way of example only and with reference to the accompanying drawings, in which:

FIG. 8 shows schematically an example of how a set of commands may be processed according to an embodiment of the technology described herein;

FIG. 11 shows schematically an example of how a set of commands including a barrier dependency may be processed according to an embodiment of the technology described herein.

DETAILED DESCRIPTION

Figure 1:
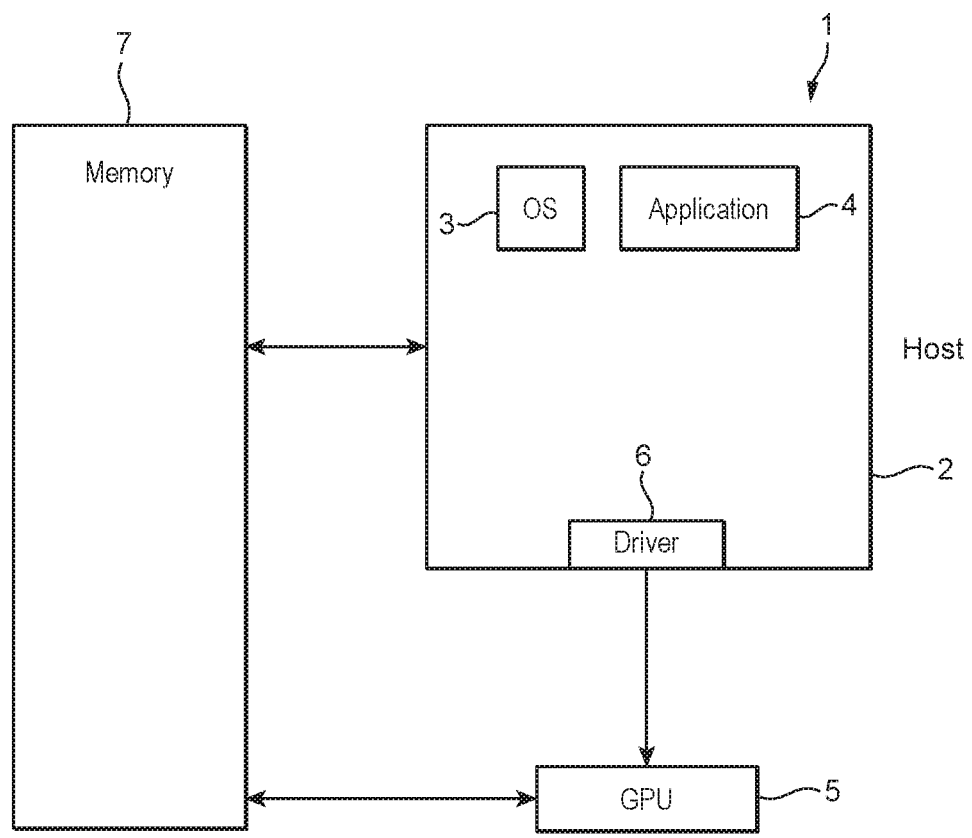
FIG. 1 shows an exemplary graphics processing system according to embodiments of the technology described herein.

A first embodiment of the technology described herein comprises a data processing system, the data processing system comprising:

a host processor that executes applications using an operating system;

an accelerator operable to process data for applications executing on the host processor, wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator; and command stream storage for storing command stream(s) prepared by the host processor and from where commands can be read into the accelerator for implementation;

wherein the accelerator comprises command stream execution circuitry comprising:

a command stream execution unit for implementing the commands within a command stream;

a cache for holding a set of commands to be executed in advance of their being provided to the command stream execution unit for implementation;

a prefetch controller for prefetching commands from the command stream storage for inclusion into the cache; and a pre-execution unit, wherein the pre-execution unit is operable to interpret a command that has been fetched from command stream storage before the command is provided to the command stream execution unit for implementation to determine whether the pre-execution unit is able to perform an action in response to the command and, when the pre-execution unit is able to do so, to perform an action in response to the command.

A second embodiment of the technology described herein comprises a method of operating a data processing system comprising:

a host processor that executes applications using an operating system;

an accelerator operable to process data for applications executing on the host processor, wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator; and command stream storage for storing command stream(s) prepared by the host processor and from where commands can be read into the accelerator for implementation;

wherein the accelerator comprises command stream execution circuitry comprising:

a command stream execution unit for implementing the commands within a command stream;

a cache for holding a set of commands to be executed in advance of their being provided to the command stream execution unit for implementation;

a prefetch controller for prefetching commands from command stream storage for inclusion into the cache; and a pre-execution unit that is operable to interpret, and then perform an action in response to at least some, commands before they are provided to the command stream execution unit for implementation;

wherein the method comprises:

the prefetch controller requesting a command from command stream storage; and the pre-execution unit interpreting the command before it is provided to the command stream execution unit for implementation to determine whether the pre-execution unit is able to perform an action in response to the command, and when it is determined that the pre-execution unit can perform an action in response to the command, the pre-execution unit performing that action.

The technology described herein relates particularly to data processing systems of the type wherein accelerator work can be specified using one or more command stream (s). That is, when an application running on a host processor makes a request for processing work by an accelerator a suitable command stream can be generated by the host processor and written to appropriate command stream storage from which storage the commands within the command streams (their contents) can then be provided to the accelerator for implementation. The accelerator is thus provided with a dedicated processing unit, a 'command stream execution unit', for implementing the instructions contained within the command stream(s). For instance, the command stream execution unit is able to execute instructions such as arithmetic, memory load/store and control flow instructions, as well as special instructions relating to control of the accelerator, e.g. to configure and trigger processing tasks on the accelerator hardware units.

To aid execution throughput, a suitable prefetching/caching mechanism is employed for prefetching commands from the (external) command stream storage into local storage on the accelerator in advance of their being needed, so that these commands are available in local storage on the accelerator when they are eventually called for execution by the command stream execution unit. Thus, the accelerator is provided with a prefetch controller that acts to prefetch commands from command stream storage into a local accelerator command (instruction) cache.

The command (instruction) cache can thus be populated with a set of commands ready for execution by the command stream execution unit that are a certain range (number of commands) ahead of the command that is currently being executed. When those commands are called for execution, the commands can then be (effectively) immediately provided to the command stream execution unit, e.g. without requiring the command to be fetched from the command stream storage.

In this way, it may be possible to reduce (hide) the latency associated with fetching commands from command stream storage (memory). This prefetching generally works well because the command stream execution is in an embodiment linear so that the commands within a command stream are executed in turn.

However, when the commands are prefetched from command stream storage in a linear fashion, there can still be instances of memory latency (latency 'bubbles') that can reduce command stream execution throughput.

For instance, within a command stream based data processing system, the accelerator, and hence the prefetching mechanism, would normally be unaware of any changes in control flow until the instruction to change the control flow is actually implemented, e.g. when the command stream execution unit executes the appropriate command(s) in the command stream for changing the control flow.

Accordingly, when there is a change in control flow, e.g. meaning that commands should now be fetched from a different (memory) location in command stream storage, the prefetching mechanism would be unaware of this and may therefore continue to prefetch commands linearly from the previous memory location.

For example, each command stream is in an embodiment stored in a (single) main command buffer in (main) memory, but this buffer may make subroutine calls (or jumps) to other buffers. However, the prefetching mechanism would normally be unaware of such changes until the subroutine call or jump instruction was executed by the command stream execution unit and would continue to fetch commands in a linear fashion from the main command buffer, for example, without taking into account the (non-linear) call or jump into another buffer.

In that case, when the call or jump is made to the new buffer, e.g. by the command stream execution implementing the appropriate command(s), the next command (the first command for the new control flow) would then not be present in the accelerator command (instruction) cache and would need to be fetched from command stream storage. The command stream execution would thus stall (pause) pending the fetching of the next command.

As another example, an instruction may cause the execution to be switched onto another execution path, e.g. depending on the result of a conditional branch/fork in the command stream. Again, normally, this would not be seen, and could not therefore be handled by the prefetch mechanism, until the switch had been implemented by the command stream execution unit.

The command stream throughput may also be reduced when implementing memory load/fetch instructions within a command stream.

For instance, because the command streams are in an embodiment generated by a driver on the host processor at the application run time (rather than being compiled off-line), it is desirable that the command stream generating circuitry on the host processor is kept relatively simple to minimise the load on the host processor associated with the command stream generation. Accordingly, it is not normally practical (or possible) to reorder commands within a command stream. This means that the commands are, therefore, normally executed in order by the command stream execution unit.

As a result of this, memory load operations would normally only be executed when they reach the command stream execution unit. The execution may therefore have to wait until the memory load operation has completed before moving on to the next command in the command stream.

However, the Applicants have now recognised that at least some commands can be acted upon earlier than would normally be the case when executing a command stream, i.e. before they reach the command steam execution unit, to mitigate these problems (and thus help to further reduce (hide) latency and improve the command stream execution throughput).

Accordingly, to do this, the technology described herein provides a special processor, or 'pre-execution unit', on the accelerator that is operable to interpret incoming commands before they are provided to the command stream execution unit (e.g. as they are being read from the external command stream storage (memory) into the accelerator) to determine whether it is able (and should) perform an action in response to the command. When it is determined that the pre-execution unit can (and should) perform an action in response to a command, the pre-execution unit can then perform that action.

For example, depending on the type of command, the pre-execution unit may be able execute (at least in part) the command 'early', so that the instruction may be (partly) implemented before reaching the command stream execution unit. (The pre-execution unit may thus at least in some cases alternatively be considered as an 'early execution unit'.)

In other cases, the pre-execution unit may not directly implement the command but may instead be operable to perform some other operation in response to the command (rather than the instruction specified by the command that would be implemented in the normal command stream execution unit). An example of this may be the pre-execution unit performing a memory prefetch/preload action in response to a command so that required data for implementing that command can be fetched into local storage on the accelerator in advance of that command being passed for implementation to the command stream execution unit.

Through this pre-execution unit the accelerator may have 'earlier' sight of commands than would normally be the case, and thus be able to perform actions in response to at least some incoming commands. The prefetch controller may therefore be able to work more aggressively (intelligently), so that it is better able to handle changes in control flow, for example, and so that the prefetch range can be extended further and/or so that the prefetch controller is able to start prefetching commands (or data) from new memory locations earlier than would normally be the case.

Thus, according to embodiments of the technology described herein, it is possible to further reduce (hide) latency 'bubbles' resulting from, e.g., changes in control flow, or memory load operations, that may be associated with command stream based systems.

For example, any changes in control flow can now be seen by the pre-execution unit, and can thus be acted on earlier than would otherwise be the case, and before they would be executed by the command stream execution unit. The pre-execution unit can thus act on such commands so that commands for the new control flow can start to be prefetched before the change in control flow is implemented by the command stream execution unit, so that these commands are then available in the local accelerator command (instruction) cache in advance of their being passed to the command stream execution unit for implementation. Similarly, the pre-execution unit may, at least in embodiments, suitably act on other memory load operations to preload the requested data into local storage on the accelerator such as a register or cache so that the data is then available for the command stream execution unit in advance of the command stream execution unit reaching that instruction.

Thus, compared to other command stream based data processing systems, the data processing systems according to embodiments of the technology described herein may provide an improved (more continuous) command stream execution throughput.

The technology described herein may generally be implemented in any suitable data processing system, as desired. The data processing system is in an embodiment (embedded) in an electronic device, and in an embodiment a portable device, such as a mobile phone, tablet, or the like.

The data processing system comprises a host processor (CPU). The host processor executes an operating system, such as Android. Various applications, such as games, may be executed using the operating system. The data processing system further comprises an accelerator that is operable to process data under the control of the operating system on the host processor. For instance, applications running on the operating system of the host processor may require additional processing resource. The host processor may thus make calls to the accelerator for performing processing work.

The accelerator may be any suitable accelerator that can, e.g., provide a processing resource for the host processor. The accelerator could, for example, comprise a graphics processing unit (GPU) or video processor (VPU), an encryption accelerator, a video accelerator, a network (processing) interface, a digital signal processor (DSP), audio hardware, etc. The accelerator can essentially comprise any component (execution/functional unit) that is optimised for a particular task. The processing that is to be performed by the accelerator can thus be any suitable and desired processing that the accelerator can perform. This will typically depend on the nature of the accelerator. For example, in an embodiment, the accelerator comprises a GPU. In that case, the processing to be performed in an embodiment comprises appropriate graphics processing, such as effects processing, overlay generation, display frame composition, etc.

The data that is to be processed by the accelerator can thus be any desired and suitable data, e.g. depending on the nature of the accelerator.

For the data processing systems of the technology described herein, the submission of processing work to the accelerator is controlled using command streams. Processing work for the accelerator can thus be specified by the host processor generating a suitable sequence of commands for implementation by the accelerator. The host processor accordingly comprises suitable command stream generating circuitry operable to prepare, in response to a request for processing to be performed by the accelerator from an application being executed by the host processor using the operating system, one or more command stream(s) to cause the accelerator to perform processing tasks for the application, each command stream including a sequence of commands for implementation by the accelerator. The command stream generating circuitry acts to translate calls for processing from (applications running on) the host processor into a sequence of commands (instructions) for implementation by the accelerator. These instruction sequences, or 'command streams', can then be provided to the accelerator for implementation thereby.

The preparation of the command streams by the host processor can be performed by any suitable and desired element and component of the host processor. However, in an embodiment, the command streams are prepared by a driver for the accelerator (which driver accordingly operates in the manner of the technology described herein). Thus in an embodiment, the command stream generating circuitry comprises programmable processing circuitry that can be programmed (e.g. and in an embodiment to operate as a driver for the accelerator) to prepare the command streams in the desired manner.

According to the technology described herein, the command streams may be stored in appropriate command stream storage. The command stream storage is external to the accelerator. For example, the command streams are in an embodiment stored in (a command stream storage portion of) main and/or system memory.

In an embodiment, the sequence of commands making up a command stream is stored in an appropriate buffer or buffers. Where plural buffers are used, they are all in an embodiment considered to be part of the same command stream (and share the same register file and other state). In an embodiment, the command sequence for a command stream is at least stored in a main, in an embodiment ring, buffer, but that main buffer can then reference (call), if desired, one or more further, in an embodiment linear, buffers that also store commands for the command stream. In the latter case, the further, e.g. linear, buffers are in an embodiment referenced by call instructions from either the main command (e.g. ring) buffer, or another further, e.g. linear, buffer which itself is eventually called from the main command (e.g. ring) buffer.

Thus, in response to a request for processing from an application being executed by the host processor using the operating system, the command stream generating circuitry (e.g. which may comprise a driver for the accelerator) may act to generate one or more command stream(s) in command stream storage, e.g., in an embodiment in respective command stream buffers.

The command stream(s) can then be provided to (made available to) the accelerator for execution.

In order to execute the command streams, the accelerator is in an embodiment provided with suitable command stream execution circuitry (generally referred to herein as a 'command stream frontend'). The command stream frontend (circuitry) may generally comprise one or more command stream interface(s) and a command stream execution unit.

The (and each) command stream interface is in an embodiment operable to cause the accelerator to execute a respective command stream that has been assigned to that command stream interface.

Thus, a (and each) command stream interface can, and in an embodiment does, have associated with it (assigned to it) a command stream buffer storing a sequence of commands (a command stream) to be implemented.

In an embodiment, a command stream interface only references a single command buffer (which is in an embodiment a ring buffer), but as discussed above, in embodiments that buffer can contain calls to one or more other (in an embodiment linear) buffers.

When a command stream is to be prepared and executed, a respective command stream interface is in an embodiment allocated (assigned to) that command stream.

This process in an embodiment comprises first configuring the command stream interface in question to enable it for operation (in an embodiment all the command stream interfaces are disabled after the accelerator is reset). The command stream interface configuration may comprise, for example, setting the accelerator address and size of the (main) command buffer that the command stream interface is to reference, the insert and extract offsets within the buffer, the priority of the command stream interface, etc.

A command stream interface for an application is in an embodiment enabled and configured (e.g., and in an embodiment, by the driver) at application start-up time.

Once a command stream interface has been enabled and configured, then the, e.g. driver, in an embodiment translates the application processing requests (e.g. the API (GLES/CL/Vulkan) requests) to command stream command sequences in the (main) command (e.g. ring) buffer (and any further associated (e.g. linear) buffers that is to be used for that command stream).

Once all the required command sequences for the command stream have been built, then the command stream is in an embodiment made visible to the corresponding command stream interface (e.g. by appropriately "flushing" the work), so that the command stream interface can then start to execute the commands in the command stream (e.g. either immediately or after any still-executing previous command streams have been completed).

Each command stream interface in an embodiment also comprises (has associated with it) a local memory and registry to which state values (parameters) for the processing jobs can be stored. Thus, parameters for processing jobs can be set and stored locally for each command stream interface (e.g. without having to include the state parameters explicitly in the job descriptors provided by the host processor).

The command stream frontend (circuitry) also includes a command stream execution unit for implementing the commands. The command stream execution unit is thus operable to fetch commands from the one or more command buffers (that are currently assigned to a command stream interface) and to then interpret and execute those commands. The instructions within the command buffer(s) are in an embodiment executed in turn (in order) (although the instructions may complete out of order).

In general, any number of command stream interfaces may be provided, as desired. For instance, in some embodiments, a plurality of (e.g. two) command stream interfaces are provided. In such cases, where a plurality of command stream interfaces are provided, the command stream execution unit may, for example, process commands from the respective command buffers in an alternating (e.g. round robin) fashion, at least in the normal mode of operation. That is, in an embodiment, where a plurality of command stream interfaces are provided, a shared command stream execution unit is provided for the plurality of command stream interfaces. However, other arrangements would of course be possible.

The execution of the command streams by the accelerator can be configured and implemented in any suitable and desired manner. For example, the accelerator may, and typically does, include an appropriate supervising controller, such as a microcontroller, that is operable to handle the scheduling of the command streams on the hardware execution resources of the accelerator. The supervising controller, or microcontroller, thus controls the operation of the command stream frontend, including assigning command streams to respective command stream interfaces, etc. The supervising controller is thus able to communicate with the host processor in order to read in new processing work (command streams). In an embodiment the host processor and controller communicate with each other via (shared data structures in) "interface memory" within the normal memory, e.g. with the host processor being operable to send a "doorbell" interrupt to the controller to indicate to the controller to look in the interface memory for new work to do (new data). The controller thus effectively schedules the processing that is performed by the accelerator using the command stream frontend.

Some commands in a command stream will be implemented natively in hardware in the accelerator. Others may be emulated in software by the controller. Thus, when a command in a command stream is executed, e.g. by the command stream execution unit, the instruction (or processing work) associated with that command may be implemented either in hardware or emulated by the controller. This will typically depend on the type of the command that is being executed. For instance, the controller may emulate certain types of instruction, e.g. relating to updating the local registry associated with the command stream interfaces, in order to set the parameters for processing jobs that are to be implemented in hardware. However, the controller is also operable to schedule and provide processing work for the accelerator hardware.

A command stream may, for example, contain commands (instructions) to set parameters for processing jobs, as well as commands (instructions) to execute the processing jobs. A typical sequence of commands for a processing job may thus include an initial sequence of commands for setting the parameters for the processing job, and then a command for performing the processing job.

For example, the command stream may contain a series of 'MOVE' commands for loading parameter values into the local memory or registry associated with that command buffer to initialise or modify the state vector. These commands can be executed in turn by the command stream execution unit in order to set the parameters for the processing job. These types of command are in an embodiment implemented natively, e.g. using appropriate command stream execution unit hardware.

The command stream execution unit is also operable to schedule processing work to be performed by the accelerator hardware. For example, a 'RUN' command may be executed wherein processing work is sent to the accelerator hardware for processing. A RUN command is effectively a processing job but with the initial state (parameters) (in an embodiment) being obtained from the local memory or registry (e.g. rather than being explicitly incorporated as a job descriptor). These commands are thus implemented (natively) in the accelerator hardware.

Other types of commands e.g. that are less frequent, of a more complex nature, that can be expected to have some delay, and/or that may need to wait on an external entity, may be emulated in software by the controller.

The accelerator hardware may typically comprise one or more iterator(s) and one or more (in an embodiment a plurality of) processing core(s). Thus, when processing work is sent to the accelerator hardware, e.g. when executing a RUN command, the processing job may be sent, along with the initial state (parameters), to a respective iterator. An iterator takes the processing job and splits it up into a number of processing tasks which can then be issued to the processing core(s). The iterator can also track the completion of the processing tasks.

In some embodiments, the iterators may be bound to a particular command stream interface. That is, each command stream interface may be associated with, and only able to submit processing jobs to, a particular set of one or more iterators. These bindings can be defined and controlled (dynamically) by the controller.

Thus, in contrast to more conventional (non-command stream based) approaches, the operation of the accelerator is (principally) controlled using the controller, with processing jobs being implemented using local memory and registers on the accelerator, and the host processor can communicate with the controller (e.g. its firmware) through shared memory (e.g. rather than the host processor directly controlling the accelerator by explicitly writing to hardware registers, as in more conventional non-command stream based approaches).

In general, any desired number of commands streams can be prepared for the accelerator. In some embodiments, (at least) two command streams are prepared. Each command stream may relate to any suitable and desired processing work. Where multiple command streams are prepared, each command stream may relate to a different type of processing task (for example, for a graphics processor, different command streams may relate to compute and non-compute (e.g. geometry) tasks, or to pilot and non-pilot shader tasks). However, in other embodiments, the command streams may relate to processing tasks of the same type (for example, in the case of a graphics processor, when performing interleaved rendering).

Each command stream should, and in an embodiment does, include one or more, and in an embodiment plural, commands (instructions). The command streams can include any suitable and desired commands (instructions) to cause the accelerator to perform the desired processing tasks, e.g., and in an embodiment, in accordance with the command stream operation of the data processing system and accelerator in question. Thus the command streams in an embodiment can, and in an embodiment do, include one or more or all of: commands (instructions) to set parameters for processing tasks, commands (instructions) to execute the processing tasks, commands (instructions) to wait for the completion of a processing task, etc.

The accelerator will execute commands in the command streams in turn (and in order), and as it does so may, for a (and for each) command stream that it is executing, track its progress through (along) the command stream (the position that it has currently reached in the command stream), for example, and in an embodiment, by maintaining a progress count for the command stream that is (in an embodiment) automatically incremented when command stream commands that are to increment the progress counter are executed. The current command stream position (progress count) could, e.g., be maintained in an appropriate register of or accessible to the accelerator. In this way, it is possible to track the completion of processing work being performed by the accelerator.

As explained above, the command streams prepared by the host processor are stored in appropriate command stream storage, which may in an embodiment comprise one or more buffer(s) within system (main) memory. To aid execution throughput at the command stream execution unit, in the technology described herein, the commands from command stream storage are therefore prefetched and cached to local storage on the accelerator.

That is, by employing a suitable prefetch mechanism, commands can be prefetched from command stream storage into local storage on the accelerator so that those commands are available when (before) they are needed by the command stream execution unit. In this way, the latency associated with fetching the commands from command stream storage can be reduced (hidden).

A prefetch controller is thus provided that is configured to prefetch commands for inclusion into local storage (a cache) on the accelerator before they are needed, and in readiness for their subsequent execution by the command stream execution unit. The prefetch controller may thus populate the accelerator command (instruction) cache with commands that are a certain range (number of commands) ahead of the command that is currently being executed at the command stream execution unit (the current 'execution address').

The prefetch controller will thus issue read requests for commands in the current command streams that are "in front of" the current execution address. The prefetched instructions may be stored in the accelerator command (instruction) cache they are until required by the command stream execution unit.

In this way, it can be ensured that these commands are (immediately) available for the command stream execution unit when they are needed, e.g. without having to fetch the commands from memory. For example, by making the "range ahead" of the prefetch mechanism correspond to the number of commands (instructions) executed for the duration of the typical memory access latency the memory latency for fetching the commands can be hidden.

The prefetch controller can thus fetch commands from command stream storage in a linear fashion. This generally works well for reducing the latency associated with fetching commands from command stream storage because the commands within a command stream are in an embodiment executed in order (and thus most of the time the commands can be fetched in order in a linear fashion).

However, linear prefetching mechanisms may be unable to efficiently handle (non-linear) changes in control flow, for example, and such instances can thus still reduce the command stream execution throughput. For instance, when the control flow is changed in such a manner that results in commands (or data) having to be fetched from a new memory location in command stream storage, the system would normally not be aware of this until the change in control flow had been implemented at the command stream execution unit. However, at that point, the next command (the first command for the new control flow) would not yet be available from local accelerator storage for the command stream execution unit and would thus have to be fetched, e.g., from system memory. The change in control flow would therefore introduce a latency 'bubble' in the command stream execution.

For example, this may be the case where the command streams are stored using a plurality of buffers, such as one or more ring buffer(s) and linear buffer(s), as described above, in which case a change in control flow may require switching from one buffer (e.g. a ring buffer) to another (e.g. linear) buffer, e.g. as part of a jump or subroutine call.

As another example, the processing of the command stream may result in switching from one execution path to another, e.g. depending on the outcome of some conditional branch.

One approach for improving the prefetching for command streams (that may be, and in an embodiment is, used in embodiments of the technology described herein) would be to specify command streams for execution with a start address and size (rather than just the start address of the program, as would typically be the case for execution in conventional general purpose processors). Knowing the size of each command stream allows the prefetch controller to work more aggressively (e.g. across MMU page boundaries) without risk of prefetching invalid memory locations. Similarly jump and subroutine call instructions in the command streams may also in an embodiment take both a subroutine address and size as parameters.

However, the Applicants have recognised that further improvements are still possible. Particularly, by interpreting and then performing an action on at least some of the commands before they reach the command stream execution unit, it may be possible to further improve the execution throughput.

Thus, according to the technology described herein, a pre-execution unit is provided (additionally to the normal command stream execution unit, which will execute most instructions) that is operable to interpret commands that have been fetched from command stream storage before those commands are provided to the command stream execution unit for implementation.

The pre-execution unit is thus able to "interpret", or analyse, an incoming command before the command is provided to the command stream execution unit for implementation, e.g. as the command is read from command stream storage (memory) into the accelerator, to determine whether it can (and should) perform any action(s) in response the command. When it is able to do so, the pre-execution unit may thus perform an action in response to the command. That is, the command may trigger the pre-execution unit to perform an action.

The pre-execution unit is thus able to perform some action (processing operation) in response to at least some types of instructions within a command stream. In this way, certain commands (instructions) can be executed, at least in part, at different (or multiple) points during the execution of a command stream.

On the other hand, when the command is a command that cannot be acted upon by the pre-execution unit, e.g. due to some processing dependence on a parameter or step that is not (yet) known by the pre-execution unit, the command may simply be passed on for execution, and executed by, the command stream execution unit in the normal way (without the pre-execution unit performing any action).

The pre-execution unit thus acts in combination with the prefetch controller so that at least some the commands that are prefetched into the accelerator may be actioned, at least in part, earlier on in the processing than would normally be the case. In this way, some of the desired processing can be effectively re-ordered on the accelerator, or brought forwards, in order to better reduce (hide) memory access latency (and e.g. without increasing the complexity of the commands or command stream generating circuitry on the host processor).

It will be appreciated that the prefetching may be, and generally is, speculative in that not all commands that are prefetched and included in the cache will subsequently be executed by the command stream execution unit, e.g. as a conditional branch may skip over some instructions. Thus, the commands that are prefetched need not (all) be subsequently executed by the command stream execution unit.

The pre-execution unit should, therefore, be arranged so that any (prefetched) instructions that are to be processed in the pre-execution unit do not (and cannot) adversely impact the result of the processing if the program control flow is later found not to include them. Which types of commands can be considered "safe" for the pre-execution unit to act upon speculatively (early) may vary, e.g. depending on the system.

Accordingly, in an embodiment, only a subset of commands within a command stream will trigger an action by the pre-execution unit, whereas other (and typically most) commands may be treated as no operation (NOP) instructions by the pre-execution unit and instead passed on for execution, and executed, (only) by the command stream execution unit.

In general, whether or not the pre-execution unit is able to, and does, perform an action in response a command will depend on the type of instruction.

For instance, certain commands may be executed (at least in part) on the pre-execution unit (in which case they may not need to be executed again on the command stream execution unit, such that they become no operation (NOP) instructions for the command stream execution unit). In an embodiment, memory access requests within, or required by, commands are executed early by the pre-execution unit. For example, commands to prefetch commands (instructions) from command stream storage will in an embodiment be executed by the pre-execution unit. Similarly, commands for prefetching data from (main) system memory into suitable local accelerator storage (such as a local accelerator data cache, or registry) are also in an embodiment executed by the pre-execution unit. These PREFETCH' commands may in an embodiment then be treated as no operation instructions in the command stream execution unit.

Commands relating to preloading data (e.g. memory 'LOAD' operations) are also in an embodiment executed at least in part by the pre-execution unit. For example, a memory LOAD command may trigger the preloading of data from (main) system memory into local storage (e.g. a cache) on the accelerator. In response to such a command reaching the pre-execution unit, the pre-execution unit may thus start to 'pull in' data into local accelerator storage. However, typically, the memory LOAD operation itself will still be executed in the command stream execution unit.

So, in some cases, a command may trigger the pre-execution unit to perform an operation responsive to that command that is not necessarily the operation specified the command. That is, the pre-execution unit may perform an action in response to a command but without implementing the command itself (so that the command would still have to be passed to the command stream execution unit for implementation in the normal way). For instance, the pre-execution unit may take some pre-action in response to the command in order to facilitate the subsequent implementation of the command by the command stream execution unit.

Another example of this may be when a command for implementing a jump or subroutine call into a new memory location (a 'CALL'/'JUMP' command) is included within a command stream. In this case, the pre-execution unit may act upon this command to start prefetching data from the new memory location. When the command stream execution unit then implements the jump or subroutine call, the prefetched data is already available in the local command (instruction) cache, and there is no need to pause execution pending the fetching of this data. These commands are therefore in an embodiment acted on by both the pre-execution unit and the command stream execution unit, but in different ways. That is, a CALL/JUMP command may trigger a prefetch/preload operation when received at the pre-execution unit, but the call or jump is only (fully) implemented when the command reaches the command stream execution unit.

The pre-execution unit is thus in an embodiment operable to execute instructions for prefetching commands and/or preloading data from memory into a local cache on the accelerator. In this way, the desired commands (data) can be fetched well in advance of their being needed, and earlier than would otherwise be the case, to reduce (hide) the associated memory latency.

Some types of commands may be processed by both the pre-execution unit and the command stream execution unit. For example, MOVE commands may be implemented at both the pre-execution unit and command stream execution unit, at least where the pre-execution unit is provided with its own (separate) registers, for updating their respective immediate parameters.

Other types of commands may require additional processing, or the execution of these commands may require information that is not (yet) known by the pre-execution unit, in which case the pre-execution unit may not be able to perform any action on these commands. These commands may thus be treated as no operation (NOP) instructions on the pre-execution unit and processed by the command stream execution unit in the normal way. For example, a RUN command will typically be executed on the command stream execution unit only.

Thus, in general, a command that is acted on in the pre-execution unit may either also be executed (at least in part) in the command stream execution unit or may be a no operation (NOP) command in the command stream execution unit. Commands that are not operated on in the pre-execution unit (NOP commands) are generally implemented (fully) in the command stream execution unit.

The pre-execution unit is arranged (relative to the memory of the system and the command stream buffer(s)) so that it is able to interpret, and act upon at least some of the, commands that have been fetched from the command stream storage before they are passed to the command stream execution unit. The pre-execution unit is in an embodiment arranged in the return path between the command stream storage and the command (instruction) cache (so that commands pass through the pre-execution unit as they are provided to the cache). The pre-execution unit is thus in an embodiment arranged to intercept incoming commands before they are provided to the command (instruction) cache. However, other arrangements are of course possible.

The command stream execution unit and the pre-execution unit share the same command streams and the commands may in an embodiment be designed for this. For instance, the design of both the command stream execution unit and the pre-execution unit can be simplified if all of the commands have the same (fixed) size, and in an embodiment this is the case. Thus, in embodiments, each of the commands within the command stream(s) has the same fixed size.

In an embodiment, the size of the commands is aligned with the memory read data bus width.

Because the pre-execution unit generally acts in advance of the command stream execution unit, the pre-execution unit will not generally know the current execution state, e.g. the current state of the accelerator processor registers (although mechanisms are also contemplated for transferring values from the register of the command stream execution unit into a register of the pre-execution unit, as discussed below). Instructions that trigger an action in the pre-execution in an embodiment do not therefore depend on the current execution state.

Thus, in some embodiments, the pre-execution unit is only able to act upon instructions that are 'self-contained' (e.g. a command that includes within the command itself any immediate parameters required for implementing the command).

However, many instructions of interest for the pre-execution unit may require a significant amount of immediate data. For example, a prefetch base address and size may not readily be fit into a fixed size instruction.

The pre-execution unit in an embodiment has (or has access to) its own set of (dummy) registers for storing immediate processing parameters. Thus, in embodiments, the pre-execution unit has its own register file for storing immediate parameters for use by the pre-execution unit. That is, the pre-execution unit in an embodiment has its own register file that is separate to the register file for the command stream execution unit (it will be appreciated that it may be advantageous for the pre-execution unit to have its own register file, rather than both the pre-execution unit and command stream execution unit sharing a register file, for example, as this may prevent any actions taken by the pre-execution unit to update its associated register file then having a negative impact on the processing at the command stream execution unit, or vice versa).

Providing a separate register file for the pre-execution unit may in turn facilitate the use of fixed size instructions. For example, instead of having to include immediate parameters within a self-contained command, a set of commands may be executed including a first command for loading the desired immediate parameters into the register file and a second command for then performing some action based on those immediate parameters.

The registers of the command stream execution unit and the pre-execution unit may overlap in function. For example, similar registers could be implemented for both the command stream execution unit and the pre-execution units. However, in some embodiments, the registers are disjunct. For example, each execution unit may implement a subset of the possible full set of registers, and the subsets need not necessarily overlap.

For instance, in some embodiments, the pre-execution unit implements a (relatively) reduced register set sufficient for holding "immediate" parameters for required instructions. That is, in some embodiments, the pre-execution unit in an embodiment (only) implements memory (pre)fetch/load instructions and corresponding instructions for loading immediate data into the pre-execution unit register file. The memory (pre)fetch/load instructions may thus take from the register file parameters for the base address and size of memory that is to be (pre)fetched into local storage (a cache) on the accelerator. The instruction for loading immediate data into the pre-execution unit register file thus specifies where in (external) memory the data is to be fetched from. The memory (pre)fetch/load instruction may also specify which accelerator cache to write the fetched data to (e.g. command stream instruction cache, shared GPU L2C or other cache).

Thus, the instruction set (which is in an embodiment common across the command stream execution unit and the pre-execution units) may, and in an embodiment does, include instructions to load immediate data into the registers, and these instructions may in an embodiment be implemented by both the command stream execution unit and the pre-execution unit for updating the respective registers thereof.

In an embodiment packets of instructions are provided together, e.g. within a single cache line. For example, instructions for the pre-execution unit are in an embodiment grouped into "packets" of commands including an instruction to load the register with immediate data as well as the instruction for the actual operation required. For example, a packet of instructions may comprise an instruction to load immediate (e.g. 32 bit) data into a (e.g. 32 bit) register as well as an instruction to then perform a desired operation using that immediate data. The instructions within each packet of instructions are thus in an embodiment executed sequentially.

Thus, in embodiments, the command stream may include packets of commands including a first command (or set of one or more first command(s)) for loading immediate parameters into a register file (which may be a register file of either, or both, of the pre-execution unit or command stream execution unit) and a second command (or set of one or more second command(s)) for performing an operation using those immediate parameters. Such commands may be acted on by either, or both, of the pre-execution unit or command stream execution unit.

The prefetch controller may in an embodiment have several active read requests (for several cache lines) at a given time. For example, the execution of a given command stream may generate various multiple read requests, potentially for multiple different memory locations. Thus, at any instant in time, multiple different cache lines may be being read into the accelerator. The prefetch controller may schedule and monitor these requests.

However, it will be appreciated that the order the read requests complete may not necessarily be the same as the order that the read requests were issued by the prefetch controller. The order in which incoming commands (cache lines) are received at the pre-execution unit can therefore potentially differ from the program order (i.e. the order in which the instructions are to be executed in the command stream execution unit according to the command stream). That is, commands (cache lines) may be provided to the early execution unit out of order (with the commands (cache lines) however still being ordered within the accelerator command (instruction) cache so that they can be presented in order to the command stream execution unit).

Accordingly, commands that are to be acted upon in the pre-execution unit should not, and in an embodiment do not, span cache lines. In an embodiment, each "packet" of commands is fully contained in a cache line (although this need not be the case, and embodiments are also contemplated, as described further below, wherein packets of commands may be extended across multiple cache lines). Each cache line (packet of instructions) can thus be interpreted independently by the pre-execution unit, so that when the instructions within a cache line trigger the pre-execution unit to perform some action, that action can be performed independently of the processing of any other cache lines.

As described above, the pre-execution unit in an embodiment has its own register file for storing immediate parameters. For example, this allows the pre-execution unit to implement instructions to load immediate parameters into its register, and to then perform operations using these immediate parameters. In some embodiments, the register file of the pre-execution unit is thus maintained strictly independently of the register file of the command stream execution unit.

However, there may be some instances wherein it is desirable in order for the pre-execution unit to be able to take an action based on a command for the command stream execution unit register values to be communicated to the pre-execution unit. For instance, there may be some information that is otherwise not knowable for the pre-execution unit. By communicating the command stream execution unit register values to the pre-execution unit, the range of actions that can be performed by the pre-execution unit can thus be increased. Thus, in embodiments, the command stream execution unit register values may be communicated to the pre-execution unit. Thus, in embodiments, the command stream(s) may include a command for updating the pre-execution unit register file based on the (current) contents of a register file of the command stream execution unit. For instance, a command may be provided that when implemented in the command stream execution unit copies values from the command stream execution unit register(s) to a register or registers of the pre-execution unit.

To do this, a synchronisation mechanism between the command stream execution unit and the pre-execution unit is in an embodiment provided. In an embodiment a synchronization mechanism involves the command stream execution unit setting an appropriate barrier (e.g. by implementing a suitable barrier signal command). A barrier may, for example, be designated through a flag or a numeric value, and the hardware may generally support more than one instance of a barrier. The pre-execution unit can then perform a check against the barrier, and only perform an action when the barrier condition is met.

The operation at the pre-execution unit may thus be conditional on the barrier values as configured by the command stream execution unit. Thus, a special command can be included that when implemented by the pre-execution unit causes the pre-execution unit to perform a barrier check, e.g. to check whether the barrier instance numeric value is greater than an immediate parameter, and to skip execution to the end of the cache line if the check fails. Alternatively, each command for implementation by the pre-execution unit that performs an action (e.g. a PREFETCH command) may also specify a barrier check.

When the barrier check passes at the pre-execution unit, the pre-execution unit is thus able to process the (next) command (instruction), accordingly. On the other hand, when the barrier check fails, the pre-execution unit in an embodiment does not process the (next) command (instruction), and the command is in an embodiment simply stored in the accelerator command (instruction) cache.

Thus, in embodiments, the command stream(s) may include a barrier signal command that when executed by the command stream execution unit implements a processing barrier, wherein the processing of commands by the pre-execution unit is conditional on (e.g. the value of) the processing barrier.

The pre-execution unit barrier state may be affected by control flow instructions in the command stream execution unit. For example, some barrier instances may be reset at start of execution of a command stream. Also, some barrier instances may be saved on calling into a sub-command stream and restored on return (e.g. where a call is made from a main (ring) buffer to a linear buffer sub-routine).

Similar 'barrier' signal commands may also be implemented in the pre-execution unit to allow loading of immediate parameters that persist outside a single cache line. That is, suitable barrier signal commands may be executed by the pre-execution unit to extend a packet of commands over multiple cache lines whilst still ensuring that the commands within the packet are executed in order (or at least are not executed out of order).

In some embodiments, the pre-execution unit supports a prefetch instruction where the address and size of the region(s) of memory to (pre)fetch themselves are fetched from memory, and the memory address to fetch those region parameters from is specified indirectly, for example, as a register plus an immediate offset. The size of the prefetch region may also be specified indirectly.

Especially in combination with a mechanism for providing immediate parameters from the command stream execution unit to the pre-execution unit, specifying the prefetch indirectly may allow the use of tables in memory to specify the prefetch regions, and by using different tables the same command stream can be executed multiple times with prefetch of different memory regions. The size of the commands can also be reduced since the memory regions can be specified using the tables rather than including these in the instructions themselves.

Thus, it will be appreciated that the data processing system according to embodiments of the technology described herein provides various advantages compared to more conventional systems. These advantages also extend, at least in part, to the accelerator itself.

Accordingly, another embodiment comprises an accelerator for use within a data processing system substantially as described herein, the accelerator being operable to read commands from external command stream storage, and comprising command stream executing circuitry comprising:

a command stream execution unit for implementing the commands within a command stream;

a cache for holding a set of commands to be executed in advance of their being provided to the command stream execution unit for implementation;

a prefetch controller for prefetching commands from the command stream storage for inclusion into the cache; and a pre-execution unit, wherein the pre-execution unit is operable to interpret a command that has been fetched from command stream storage before the command is provided to the command stream execution unit for implementation to determine whether the pre-execution unit is able to perform an action in response to the command and, when the pre-execution unit is able to do so, to perform an action in response to the command.

The accelerator according this to this further embodiment may be operated substantially as described above in relation to the first and second embodiments and in accordance with any of their embodiments.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, unless otherwise indicated, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program comprising computer software code for performing the methods herein described when the program is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

FIG. 1 shows an exemplary data processing system 1 that may, for instance, comprise an embedded data processing system for use, for example, in a portable electronic device, such as a mobile phone or tablet. The data processing system includes a host processor (CPU) 2 on which an operating system (OS) 3, and one or more applications 4 may execute.

The data processing system also includes an associated graphics processing unit (GPU) 5 that can perform graphics processing operations for the applications 4 and the operating system 3 executing on the host processor 2. To facilitate this, the host processor 2 also executes a driver 6 for the GPU 5. For instance, an application 4 such as a game executing on the host processor 2 may various require graphics processing operations to be performed by the GPU 5. To do this, the application will generate API (Application Programming Interface) calls that are interpreted by the driver 6 to generate appropriate commands for the GPU 5 to generate the graphics output required by the application 4.

Particularly, the driver 6 is operable to generate a set of "commands" to be provided to the GPU 5 in response to requests from the application 4 running on the host processor 2 for graphics output (e.g. to generate a frame to be displayed). In the present embodiments, the appropriate commands and data for performing the processing tasks required by the application 4 are provided to the GPU 5 in the form of one or more command stream(s), that each include a sequence of commands (instructions) for causing the graphics processor to perform desired processing tasks.

The command streams are prepared by the driver 6 on the host processor 2 and may, for example, be stored in appropriate command stream buffers in system memory 7, from where they can then be read into the GPU 5 for execution. Each command stream may contain commands (instructions) to set parameters for graphics processor tasks, as well as commands (instructions) to execute a task, etc.

Figure 2:
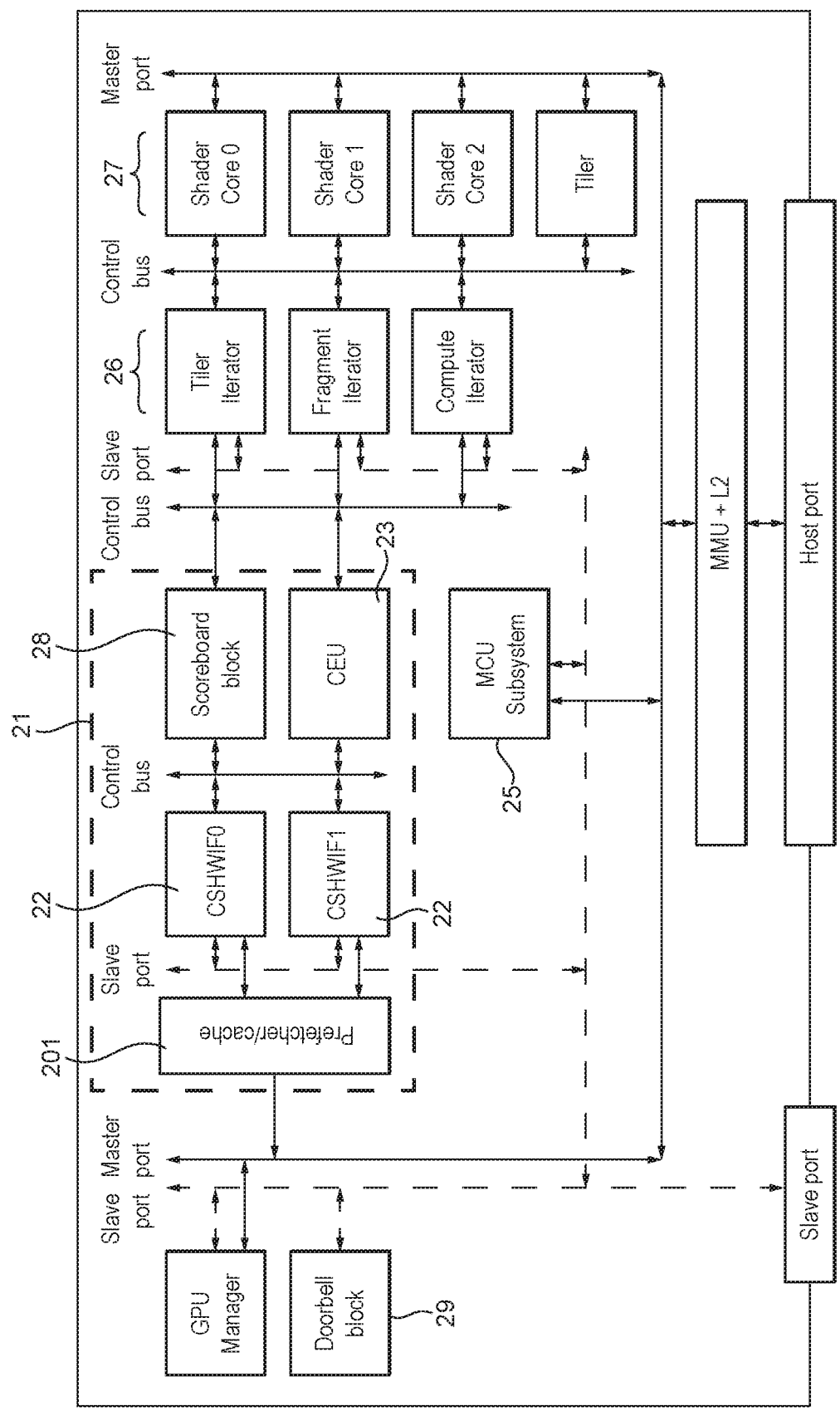
FIG. 2 shows schematically in more detail a graphics processor (including a command stream frontend) that can be operated in the manner of the technology described herein.

The GPU 5 thus includes a command stream frontend for receiving and interpreting these command streams and to control job submission for the GPU 5. FIG. 2 shows in more detail the GPU 5 including the command stream frontend 21. The command stream frontend 21 is generally operated under the control of a supervising microprocessor (MCU) 25, which handles communications with the host processor 2, and schedules the processing of active command streams on the command stream frontend 21.

The command stream frontend 21, which may be implemented as a single (hardware) functional unit, generally comprises one or more command stream interfaces 22 and a (shared) command stream execution unit 23. Each command stream interface 22 has an associated linear (or ring) command buffer containing a set of active instructions to be processed, as well as a registry and local memory for storing the internal state (parameters) for the processing. The command buffer is contained in system memory 7 with the command stream interface containing its properties so it can obtain commands from it.

The instructions within the command buffer(s) can then be provided to the command stream execution unit 23 and then executed in turn (e.g. in a round robin fashion where multiple command stream interfaces 22 are provided). The command stream execution unit 23 thus executes the commands in turn, with the instructions either being emulated in software by the MCU 25, or assigned to the accelerator hardware, e.g. depending on the type of instruction.

(In general when the command stream execution unit 23 executes an instruction, it will either perform the operation synchronously itself (e.g. a move operation), or it will "package up" a request and send it to the accelerator hardware (e.g. a run command), or it will inform the supervising MCU 25, which may then emulate the command in software.)

The command stream frontend 21 also includes a scoreboard block 28 that is able to independently track the processing job completion for each of the command steam interfaces 22. The scoreboard block 28 is thus a shared resource. The scoreboard block 28 tracks the progress of the processing tasks associated with each processing job and reports this back.

As shown in FIG. 2, the accelerator hardware may typically comprise a plurality of iterators 26 (here, separate tiler, fragment and compute iterators are provided, although other arrangements would of course be possible) and processing (e.g. shader) cores 27. A processing job specified in a command being executed by the command stream execution unit 23 can thus be assigned and sent to a respective iterator 26, along with the current parameters held within the registry and local memory. The iterator 26 acts to break down the processing job into a set of processing tasks which can then be distributed between the processing cores 27 for processing.

The host processor 2 communicates with the MCU 25 of the GPU 5 via a shared interface memory, which may be main memory, or another suitable memory cache, depending on the configuration. For example, as shown in FIG. 2, the shared interface memory may be accessed through a suitable host port, and via the memory management unit (MMU) and L2C of the GPU 2. Thus, when an application 4 running on the host processor 2 makes a call for processing by the GPU 5, the host processor 2 can communicate with the MCU 25 of the GPU 5 via the shared interface memory, and the MCU 25 can then read the data in from the shared interface memory. For instance, the host processor 2 can write to a doorbell block 29 to interrupt the current operation of the MCU 25 and cause the MCU 25 to handle new work.

Once the MCU 25 receives a request from the host processor 2 to execute a command stream, the MCU 25 can then assign a respective command stream interface 22 for the command stream, and the command stream properties can then be written into the assigned interface. The commands are then passed in order from the command buffer to a command stream execution unit 23 which interprets the commands from the command buffers, and executes the commands using the local memory and registry information associated with that command buffer.

When a command is executed by the command stream execution unit 23, depending on the type of instruction, the instruction may then be performed either in hardware (e.g. by the command stream execution unit 23 itself, or using the iterators 26 and shader cores 27), or may be emulated by the MCU 25. For instance, any commands e.g. for updating the local memory and registry information may typically be implemented by the command stream execution unit 23 itself in order to set the parameters for a processing job. The processing job may then be sent to the accelerator hardware for processing, along with these parameters.

Figure 3:
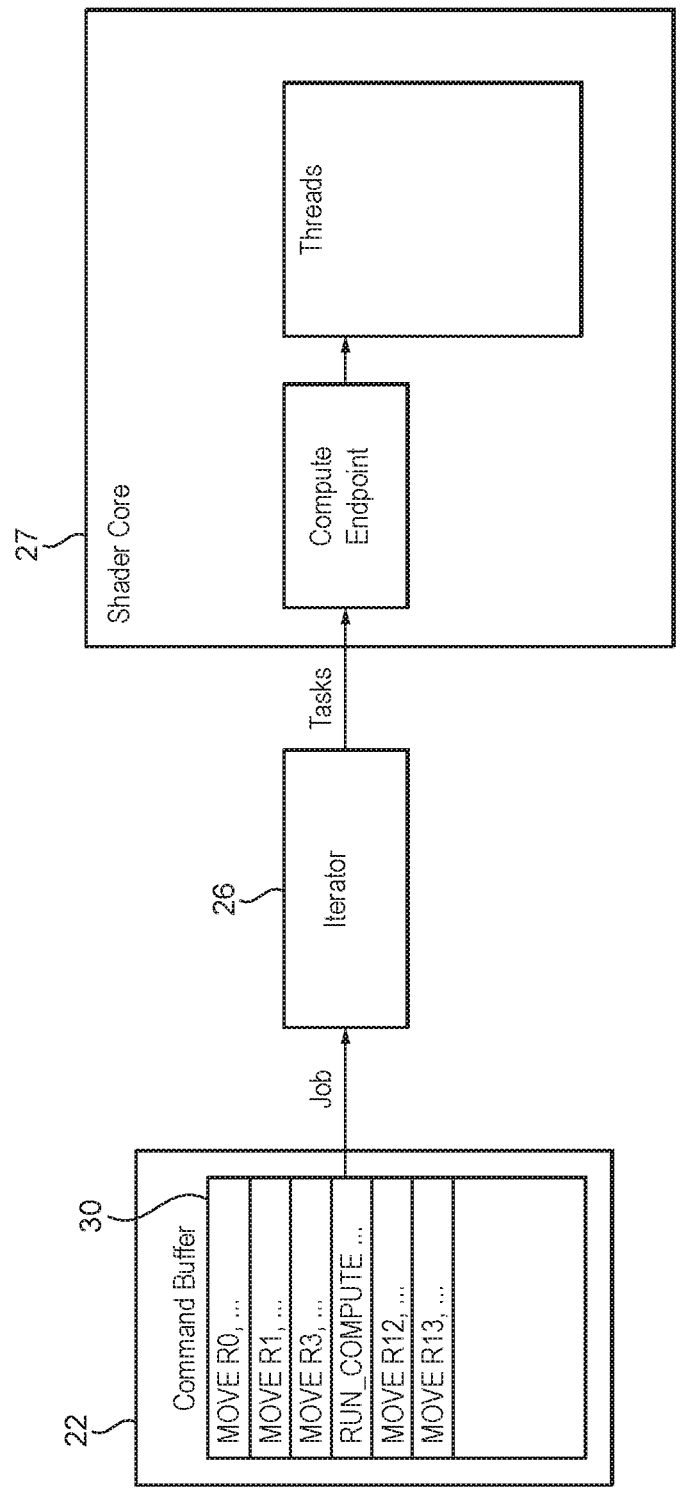
FIG. 3 shows schematically how a command stream may be executed using a graphics processor like that shown in FIG. 2.

FIG. 3 illustrates the execution of a command buffer within a system like that shown in FIG. 2. The command buffer 30 includes a sequence of instructions of different types, including e.g. 'MOVE' and 'RUN' commands. The MOVE commands, for example, load constants into the local memory on the command stream interfaces in order to initialise or modify the state vectors for a processing job. The 'RUN' command then sends the state vector to an iterator to start the processing job iteration. Various other types of commands may also be used, for instance, a 'LOAD' command may be implemented to bulk read from/write to system memory. A 'WAIT' command may also be implemented to cause the processing to wait for the completion of any asynchronous (e.g. RUN or LOAD) commands.

MOVE commands will be implemented within the command stream execution 23.

LOAD and WAIT commands (and also "synchronisation" commands) will typically be emulated in firmware by the MCU 25.

The RUN commands are implemented in the external hardware. Thus, as shown in FIG. 3, when a RUN command is executed, a processing job is then sent to the respective iterator 26 (along with the state vector whose value has been initialised in the previous commands). The iterator 26 then breaks the processing jobs into smaller processing tasks which are then issued to the shader core(s) 27. Each shader core may comprise an endpoint that is able to take a task and issue it to the thread groups within the shader core. The iterators 26 may be bound to a particular command stream interface 22 before starting an asynchronous command.

The GPU 5 and host processor 2 both have access to memory 7 where the data they are processing may be stored. As described above, the command stream buffers are in an embodiment stored in main (system) memory. To aid execution throughput, the commands from the buffers (their contents) can therefore be prefetched and cached into local storage on the accelerator when the command stream is being/is to be executed. Thus, the accelerator further includes a prefetcher 201 that comprises a prefetch controller and instruction cache. The prefetcher 201 is operable to prefetch command stream instructions from the system memory for storage into an instruction cache of the prefetcher on the accelerator ahead of their execution by the command stream execution unit 23.

Figure 4:
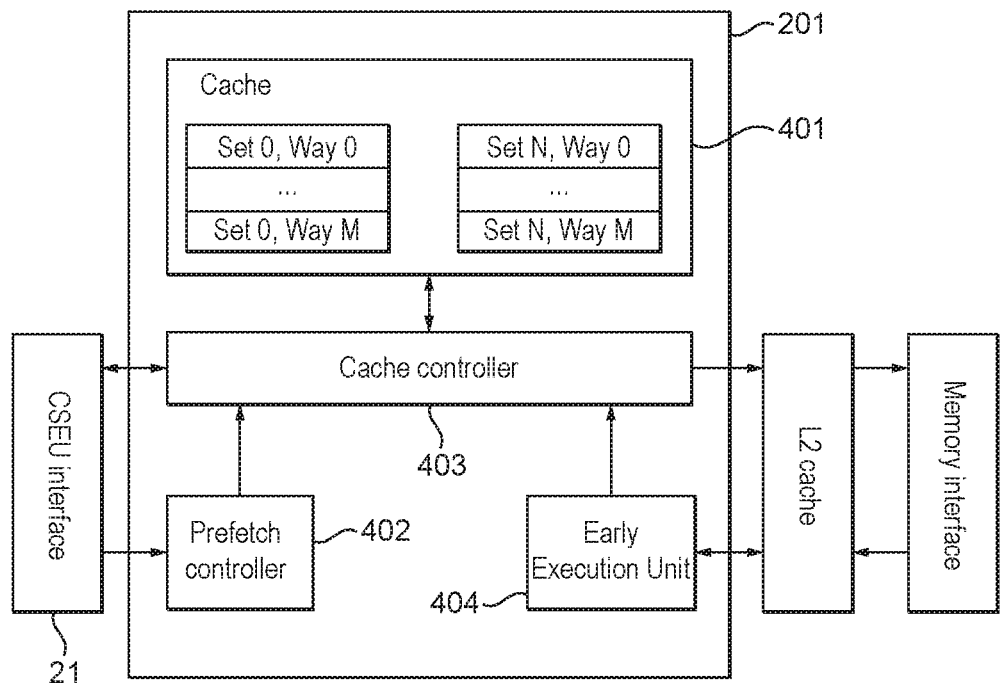
FIG. 4 shows in more detail an example of a prefetcher/instruction cache arrangement according to embodiments of the technology described herein wherein a pre-execution unit is provided for executing at least some commands before they are provided to the command stream execution unit of the command stream frontend.

FIG. 4 shows in more detail the arrangement of the prefetcher 201 according to an embodiment of the technology described herein. The prefetcher 201 is generally arranged between the system memory 7 and the command stream interface(s) 22, as part of the command stream frontend 21, as illustrated in FIG. 2. As shown in FIG. 4, the command stream frontend 21 communicates with a prefetch controller 402 and a cache controller 403. Thus, the prefetch controller 402 can communicate with the cache controller 403 to request the required instructions from the system memory 7 for inclusion into the accelerator command (instruction) cache 401. The accelerator command (instruction) cache 401 can therefore be populated with a set of commands well in advance of their being called for execution by the command stream execution unit 23.

Within the return path from the system memory 7 to the command (instruction) cache 401 there is provided a special processing unit, which may be referred to as an 'early' or "pre-execution" unit, that is able to interpret and act upon (at least some of) the commands as they are read from memory. That is, when the prefetch controller 402 makes a read request to memory for a command, the response is first passed through the pre-execution unit 404.

Figure 5:
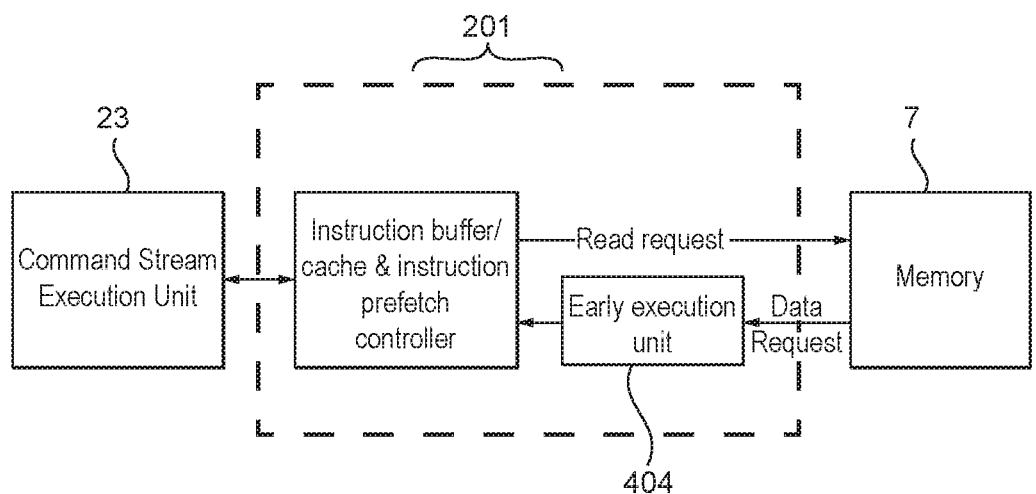
FIG. 5 shows schematically an embodiment of the technology described herein.

FIG. 5 shows more schematically the arrangement of the pre-execution unit 404 between the system memory 7 and the command (instruction) cache according to an embodiment of the technology described herein.

The pre-execution unit 404 is able to implement at least some of these commands before the command stream execution unit reaches those commands. This can provide various advantages. For instance, in this way, the system has earlier sight of such instructions and so is better able to deal with, e.g. changes in control flow, so that the system is able to continue prefetching commands (or data) for the command stream execution unit even in the event that there is a change in control flow meaning that these must now be fetched from a new memory location.

Figure 6:
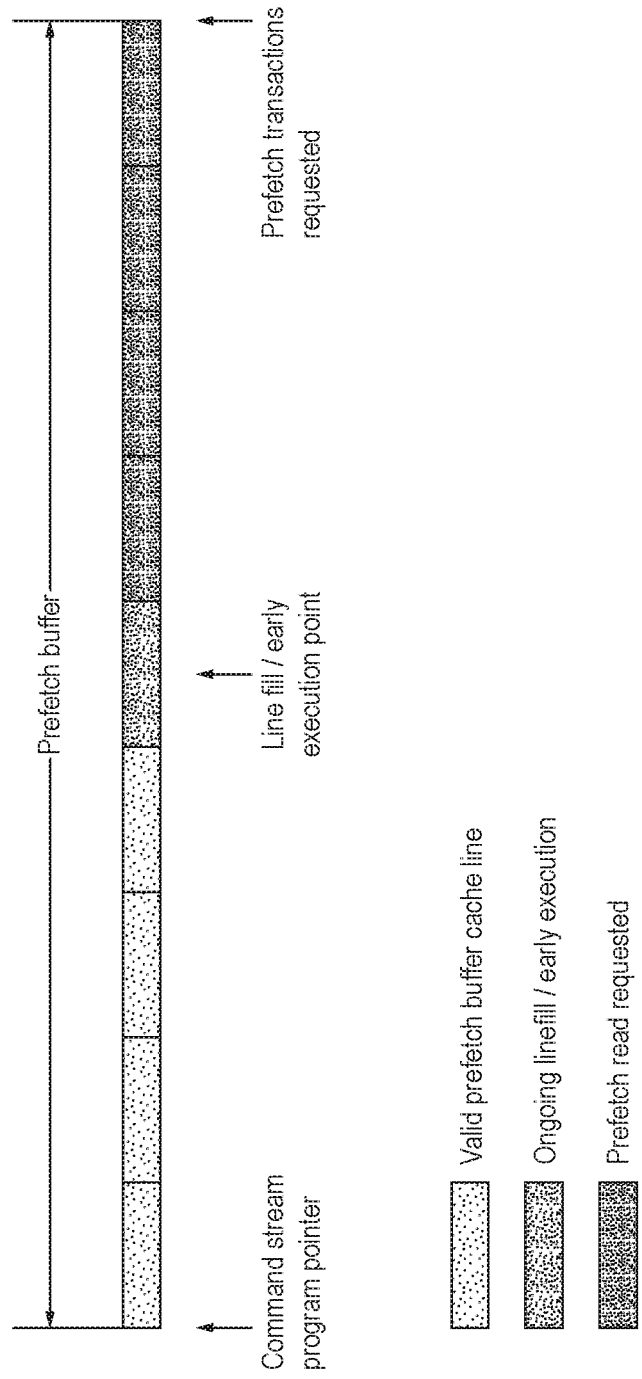
FIG. 6 shows schematically the state of the instruction cache at a particular processing instance.

FIG. 6 shows the state of the command (instruction) cache at a particular instance during the processing. As shown, the cache includes a first set of valid prefetch buffer cache lines (sets of commands) that are ready for execution by the command stream execution unit. The cache also includes an on-going linefill operation, which represents a cache line that has been requested from memory and is now being provided back to the cache via the pre-execution unit. There are also a number of active read requests that have not yet been processed.

Figure 7:
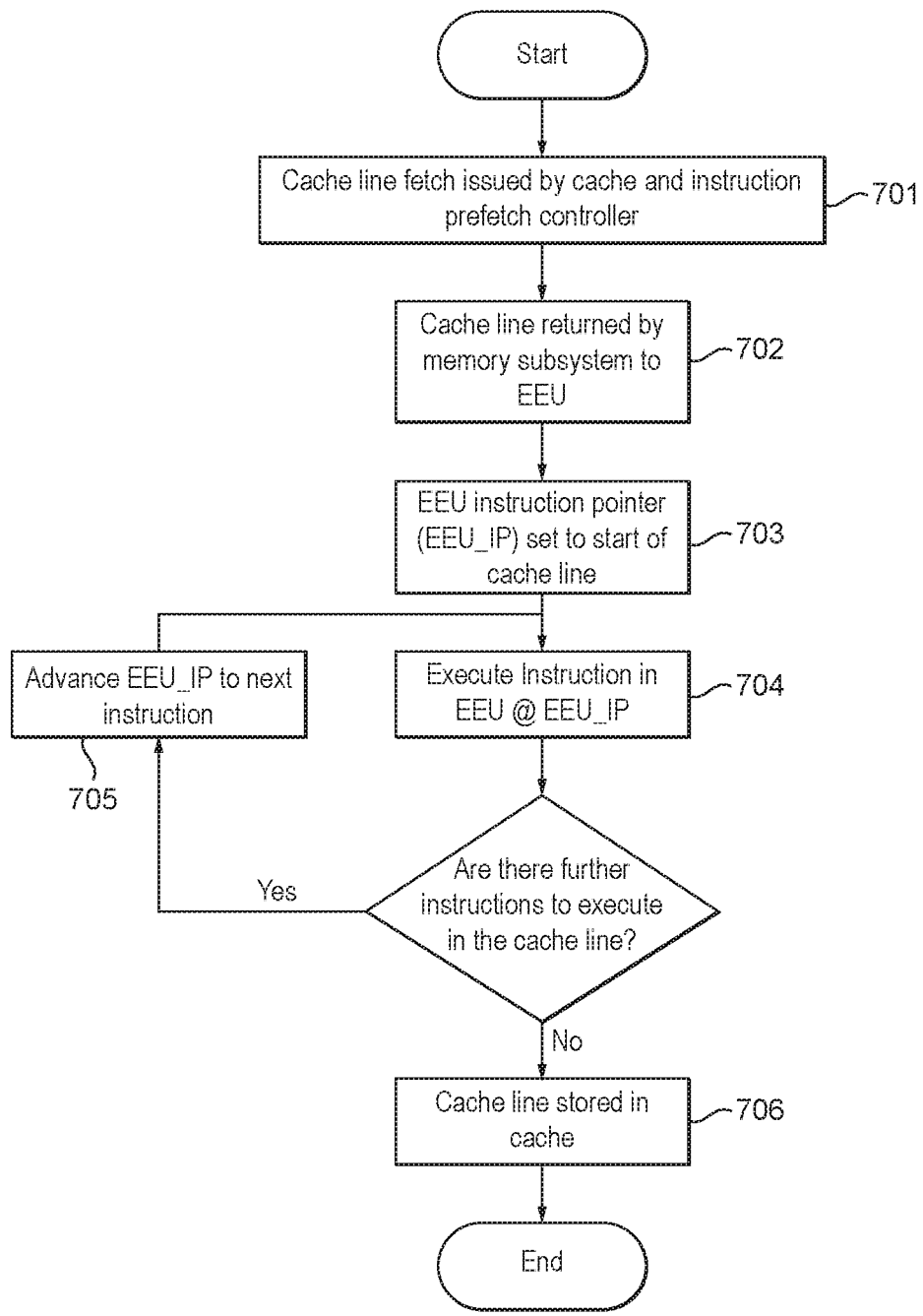
FIG. 7 is a flowchart illustrating an example of an embodiment of the technology described herein.

FIG. 7 is a flowchart showing the processing flow according to an embodiment of the technology described herein.

In a first step, a cache line fetch is issued by the cache and instruction prefetch controller (step 701). The cache line is then returned from the memory subsystem to the pre-execution unit (step 702). The pre-execution unit can then analyse the instruction to see if it can act upon it. Where the pre-execution unit is able to execute the instruction, its instruction pointer is set to the start of the cache line (step 703), and the pre-execution unit then executes the instruction (step 704). If there are further instructions to execute in the cache line, the instruction pointer of the pre-execution unit is set to the next instruction (step 705), and this instruction is then executed, and so on, until there are no further instructions to execute in the cache line. The cache line is then stored in the cache (step 706), so that it is available for the command stream execution unit.

FIG. 8 shows an example of how the commands within a command stream may be implemented differently in the pre-execution and command stream execution units. In this example, the command stream contains a set of commands including instructions such as 'MOVE', 'PREFETCH', 'RUN_COMPUTE' and 'CALL' commands.

The MOVE commands load immediate parameters into a local registry and can be acted upon at both the pre-execution unit (for moving the parameters into the register thereof) and the command stream execution unit (for updating its local register).

The PREFETCH command is an instruction to prefetch commands/data for inclusion into one or more caches within the GPU 5. For example, a PREFETCH command may be used for prefetching either (or both) command stream commands for inclusion into the command (instruction) cache 401 of the GPU 5 or for fetching data for inclusion into another local data cache (not shown) on the GPU 5. A PREFETCH command can thus be acted on by the pre-execution unit. Since the required commands/data can be prefetched at this point in response to the pre-execution unit acting on the command, there is no need to perform this action again at the command stream execution unit (and this command is therefore a NOP command at the command stream execution unit).

On the other hand, the pre-execution unit is not operable to implement the RUN_COMPUTE command, and this is only implemented at the command stream execution unit.

The CALL command is acted upon by both the pre-execution unit and the command stream execution unit, but in different ways. Particularly, in response to this command, the pre-execution unit is operable to prefetch the requested commands for the change in program flow. The command stream execution unit can then call the prefetched commands. In this way, the bubble which would be caused by the change in program flow can be hidden.

In an embodiment the commands each have the same (fixed) size. To allow the use of fixed size commands, in embodiments, the pre-execution unit may implement its own set of separate registers. In this way, instructions can be provided as "packets" of commands, e.g. within a single cache line, with a packet of commands including an instruction to load immediate parameters as well as an instruction to then perform an operation using the immediate parameters. In this way it is possible to keep the size of the commands fixed, as it is not necessary to include within the commands themselves the immediate parameters. This also helps to simplify the requirements of the pre-execution unit.

By providing the pre-execution unit with its own separate register, it can be ensured that any processing on the pre-execution unit does not (and cannot) negatively impact upon, the operation in the command stream execution unit. However, because the pre-execution unit has its own separate register, and because there is some information that may not be knowable for the pre-execution unit, there are cases where in order for the pre-execution unit to be able to act upon a command, the pre-execution unit may require information from the command stream execution unit registers. Thus, to allow such information to be safely transferred into the local registry of the pre-execution unit (without negatively impacting the operation of the pre-execution unit, e.g. by overwriting a local registry value that the pre-execution unit has just loaded and is about to use), the local registry of the pre-execution unit may need to be synchronised with that of the command stream execution unit. One way to do this would be to use execution "barriers".

Figure 9:
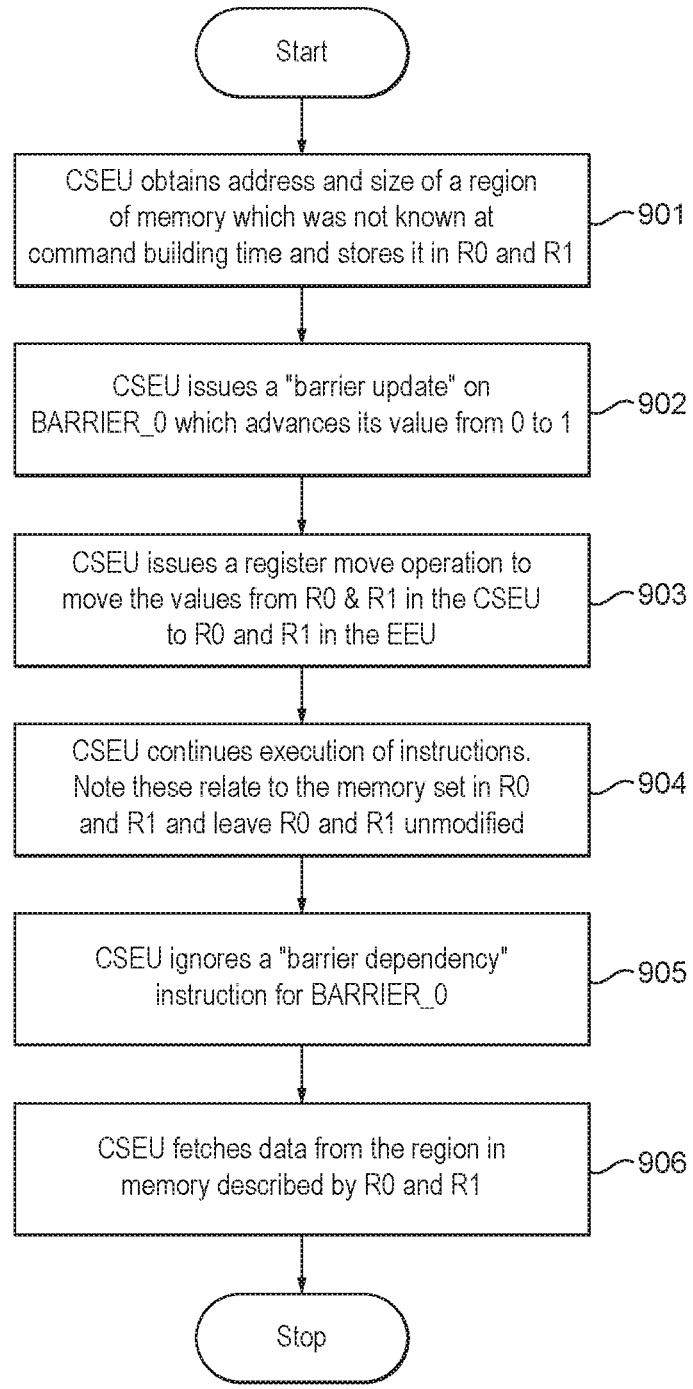
FIGS. 9 & 10 are flowchart illustrating an example of how a barrier signal may be processed at, respectively, the command stream execution unit and the pre-execution unit.

FIG. 9 is a flowchart showing how such barriers can be set up by implementing suitable instructions in the command stream execution unit. For instance, initially the command stream execution unit obtains the address and size of a region of memory which was not known at the time the command was built, and stores this as immediate parameter values R0 and R1 (step 901). The command stream execution unit then issues a "barrier update" which advances a value of the barrier from 0 to 1 (step 902). The command stream execution unit then issues a register move operation to move the values from R0 and R1 in the command stream execution unit register into the register file for the pre-execution unit (step 903). The command stream execution unit then continues its execution of the commands based on the immediate parameter values R0 and R1 in its register file (which are left unmodified until the next instance of their needing to be updated) (step 904). The command stream execution unit thus ignores any barrier dependency instructions (step 905) and when executing the commands fetches the data, as required, from the memory regions described by R0 and R1.

Figure 10:
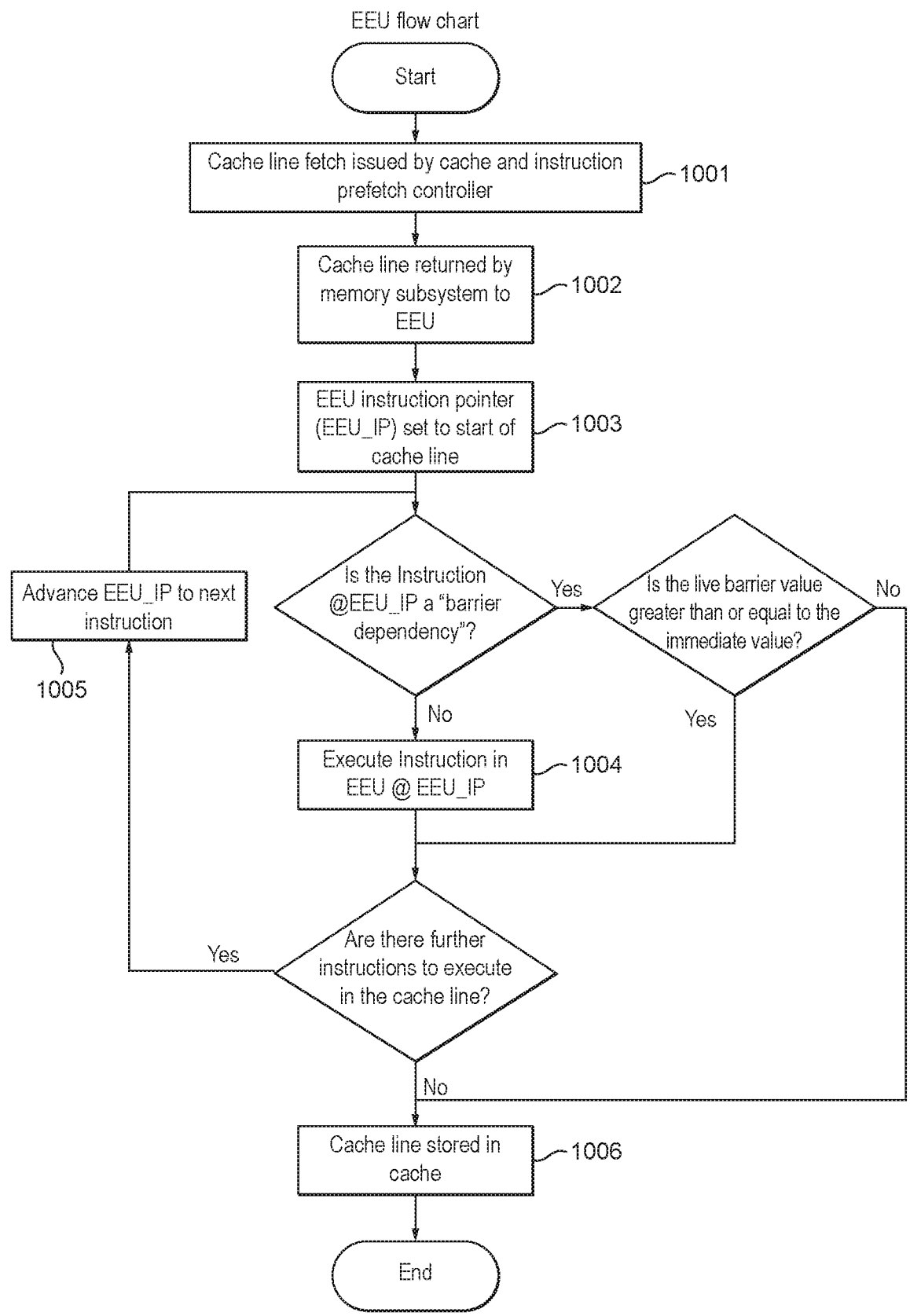

FIG. 10 shows the general processing flow in the pre-execution unit in this case. Initially, a cache line fetch is issued by the prefetch controller (step 1001), and the cache line is then returned from the system memory to the pre-execution unit (step 1002). The pre-execution unit is then pointed to the start of the cache line (step 1003). So long as the instruction is not a barrier dependency, the pre-execution unit can then execute the instruction (step 1004), and if there are further instructions in the cache line to be executed, the pre-execution unit pointer can then be advanced to the next instruction (step 1005). Once all of the instructions in the cache line have been executed, the cache line can then be stored in the cache (step 1006).

On the other hand, if the instruction is a barrier dependency, a check is performed to ascertain whether the live barrier value is greater than or equal to the immediate value. If so, the pre-execution unit can act upon the instruction, and so if there are further instructions in the cache line to be executed, the pre-execution unit pointer can then be advanced to the next instruction (step 1005).

However, if the live barrier value is not greater than or equal to the immediate value, the pre-execution unit should not act upon the instruction (as the barrier condition is not met) and the cache line is simply stored in the cache (step 1006).

FIG. 11 then shows an example of how a typical command stream may be interpreted by the pre-execution unit and command stream execution unit using a barrier mechanism. In particular, FIG. 11 shows how the execution differs depending on whether the barrier passes or fails.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A data processing system, the data processing system comprising:
    a host processor that executes applications using an operating system;
    an accelerator operable to process data for applications executing on the host processor, wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator; and
    command stream storage for storing command stream(s) prepared by the host processor and from where commands can be read into the accelerator for implementation;
    wherein the accelerator comprises command stream execution circuitry comprising:
    a command stream execution unit for implementing the commands within a command stream;
    a cache for holding a set of commands to be executed in advance of their being provided to the command stream execution unit for implementation;
    a prefetch controller for prefetching commands from the command stream storage for inclusion into the cache; and
    a pre-execution unit, wherein the pre-execution unit is operable to interpret a command that has been fetched from command stream storage before the command is provided to the command stream execution unit for implementation to determine whether the pre-execution unit is able to perform an action in response to the command and, when the pre-execution unit is able to do so, to perform an action in response to the command.

2. The data processing system of claim 1, wherein the pre-execution unit has a register file for storing immediate parameters for use by the pre-execution unit.

3. The data processing system of claim 2, wherein the command stream(s) include commands for updating the pre-execution unit register file based on the contents of a register file of the command stream execution unit.

4. The data processing system of claim 1, wherein each of the commands within the command stream(s) has the same fixed size.

5. The data processing system of claim 1, wherein the command stream(s) include packets of commands including one or more first command(s) for loading immediate parameters into a register file and one or more second command(s) for performing an operation using those immediate parameters.

6. The data processing system of claim 5, wherein each packet of commands is fully contained within a single line of the cache.

7. The data processing system of claim 1, wherein the command stream(s) include barrier signal commands that when executed by the command stream execution unit implement a processing barrier, and wherein the processing of commands at the pre-execution unit is conditional on the value of the processing barrier.

8. The data processing system of claim 1, wherein the pre-execution unit is operable to act upon a prefetch command to prefetch command(s) from command stream storage into the cache.

9. The data processing system of claim 1, wherein the pre-execution unit is operable to act upon a memory load command to preload data from memory into the accelerator.

10. The data processing system of claim 8, wherein the location in command stream storage and/or memory is specified indirectly as a register value and an offset.

11. The data processing system of claim 1, wherein when the pre-execution unit is not able to act upon a command, that command is treated as a no operation command in the pre-execution unit and is executed by the command stream execution unit.

12. An accelerator for use within a data processing as claimed in claim 1, the accelerator being operable to read commands from external command stream storage, and comprising command stream executing circuitry comprising:
    a command stream execution unit for implementing the commands within a command stream;
    a cache for holding a set of commands to be executed in advance of their being provided to the command stream execution unit for implementation;
    a prefetch controller for prefetching commands from the command stream storage for inclusion into the cache; and
    a pre-execution unit, wherein the pre-execution unit is operable to interpret a command that has been fetched from command stream storage before the command is provided to the command stream execution unit for implementation to determine whether the pre-execution unit is able to perform an action in response to the command and, when the pre-execution unit is able to do so, to perform an action in response to the command.

13. A method of operating a data processing system comprising:
a host processor that executes applications using an operating system;
an accelerator operable to process data for applications executing on the host processor, wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator; and
command stream storage for storing command stream(s) prepared by the host processor and from where commands can be read into the accelerator for implementation;
wherein the accelerator comprises command stream execution circuitry comprising:
a command stream execution unit for implementing the commands within a command stream;
a cache for holding a set of commands to be executed in advance of their being provided to the command stream execution unit for implementation;
a prefetch controller for prefetching commands from command stream storage for inclusion into the cache; and
a pre-execution unit that is operable to interpret, and then perform an action in response to at least some, commands before they are provided to the command stream execution unit for implementation;
wherein the method comprises:
the prefetch controller requesting a command from command stream storage; and
the pre-execution unit interpreting the command before it is provided to the command stream execution unit for implementation to determine whether the pre-execution unit is able to perform an action in response to the command, and when it is determined that the pre-execution unit can perform an action in response to the command, the pre-execution unit performing that action.

14. The method of claim 13, wherein the pre-execution unit has a register file for storing immediate parameters for use by the pre-execution unit, the method comprising loading immediate parameters into the register file in response to execution a command.

15. The method of claim 14, wherein the command stream(s) include commands for updating the pre-execution unit register file based on the contents of a register file of the command stream execution unit, the method comprising updating the pre-execution unit register file in response to executing such a command.

16. The method of any claim 13, wherein each of the commands within the command stream(s) has the same fixed size.

17. The method of claim 13, wherein the command stream(s) include packets of commands, wherein each packet of commands is fully contained within a single line of the cache.

18. The method of claim 13, wherein the command stream(s) include barrier signal commands that when executed by the command stream execution unit implement a processing barrier, the method comprising checking a value of the processing barrier at the pre-execution unit, wherein the processing of commands at the pre-execution unit is conditional on the value of the processing barrier.

19. The method of claim 13, comprising the pre-execution unit acting upon a prefetch command to prefetch command(s) from command stream storage into the cache and/or comprising the pre-execution unit acting upon a memory load command to preload data from memory into the accelerator.

20. A non-transitory computer readable storage medium storing software code that when executing on a data processor performs a method of operating a data processing system that comprises a host processor that executes applications using an operating system; an accelerator operable to process data for applications executing on the host processor, wherein the host processor comprises command stream generating circuitry operable to prepare, in response to a request for processing to be performed by the accelerator from an application being executed on the host processor, one or more command stream(s) for causing the accelerator to perform processing tasks for the application, each command stream including a sequence of commands for implementation by the accelerator; and command stream storage for storing command stream(s) prepared by the host processor and from where commands can be read into the accelerator for implementation;
wherein the accelerator comprises command stream execution circuitry comprising: a command stream execution unit for implementing the commands within a command stream; a cache for holding a set of commands to be executed in advance of their being provided to the command stream execution unit for implementation; a prefetch controller for prefetching commands from command stream storage for inclusion into the cache; and
a pre-execution unit that is operable to interpret, and then perform an action in response to at least some, commands before they are provided to the command stream execution unit for implementation;
the method comprising:
the prefetch controller requesting a command from command stream storage; and
the pre-execution unit interpreting the command before it is provided to the command stream execution unit for implementation to determine whether the pre-execution unit is able to perform an action in response to the command, and when it is determined that the pre-execution unit can perform an action in response to the command, the pre-execution unit performing that action.

* * * * *